(12) United States Patent
Hayes et al.

(10) Patent No.: US 12,337,406 B2
(45) Date of Patent: Jun. 24, 2025

(54) CONTOURED ELECTRODES FOR JOINING WORKPIECES WITH CURVED SURFACES

(71) Applicant: KTH Parts Industries, Inc., St. Paris, OH (US)

(72) Inventors: Michael J. Hayes, Fort Collins, CO (US); Johnathan H. Mead, Columbus, OH (US)

(73) Assignee: KTH Parts Industries, Inc., St. Paris, OH (US)

( * ) Notice: Subject to any disclaimer, the term of this patent is extended or adjusted under 35 U.S.C. 154(b) by 103 days.

(21) Appl. No.: 17/713,184

(22) Filed: Apr. 4, 2022

(65) Prior Publication Data

US 2023/0311237 A1    Oct. 5, 2023

(51) Int. Cl.
*B23K 11/30*      (2006.01)

(52) U.S. Cl.
CPC .............................. *B23K 11/3081* (2013.01)

(58) Field of Classification Search
CPC .................................................. B23K 11/3081
USPC ...................................................... 219/91.2
See application file for complete search history.

(56) References Cited

U.S. PATENT DOCUMENTS

| | | | |
|---|---|---|---|
| 1,607,262 A | 6/1921 | Ledwinka | |
| 5,645,738 A * | 7/1997 | Cecil | B23K 11/253 219/56 |
| 5,708,248 A | 1/1998 | Poss et al. | |
| 5,739,496 A | 4/1998 | Asakura et al. | |
| 6,373,021 B1 | 4/2002 | Wang et al. | |
| 6,765,170 B2 | 7/2004 | Chen et al. | |
| 7,060,929 B2 | 6/2006 | Sun et al. | |
| 9,089,924 B2 | 7/2015 | Matsushita et al. | |
| 2006/0081563 A1* | 4/2006 | Ueda | B23K 11/3081 219/119 |
| 2021/0086280 A1* | 3/2021 | Budiselic | B23K 35/222 |

FOREIGN PATENT DOCUMENTS

| | | |
|---|---|---|
| CN | 203426587 U | 2/2014 |
| CN | 204893184 U | 12/2015 |
| CN | 112589247 A | 4/2021 |
| DE | 19612164 A1 | 10/1996 |
| DE | 102016006249 A1 | 11/2016 |
| WO | 2015/133096 A1 | 9/2015 |

OTHER PUBLICATIONS

International Search Report and Written Opinion from corresponding PCT/US2023/063401 dated Jun. 7, 2023.

* cited by examiner

*Primary Examiner* — Chris Q Liu
*Assistant Examiner* — James F Sims, III
(74) *Attorney, Agent, or Firm* — Porter Wright Morris & Arthur LLP

(57) ABSTRACT

A welding electrode for use in resistance spot welding an assembly of metal workpieces with curved surfaces and closed or open sections is disclosed. The welding electrode includes a body, a weld face at one end of the body, and contoured curvature forming the weld face. The contoured curvature is configured to seat around the curved surfaces of the metal workpieces when the weld face is pressed against the workpieces during a resistance spot weld event. When brought into contact with the curved surface of the workpiece, the electrode has an optimal contact area, which improves the spot weld process by improving the pressure and current distributions.

21 Claims, 17 Drawing Sheets

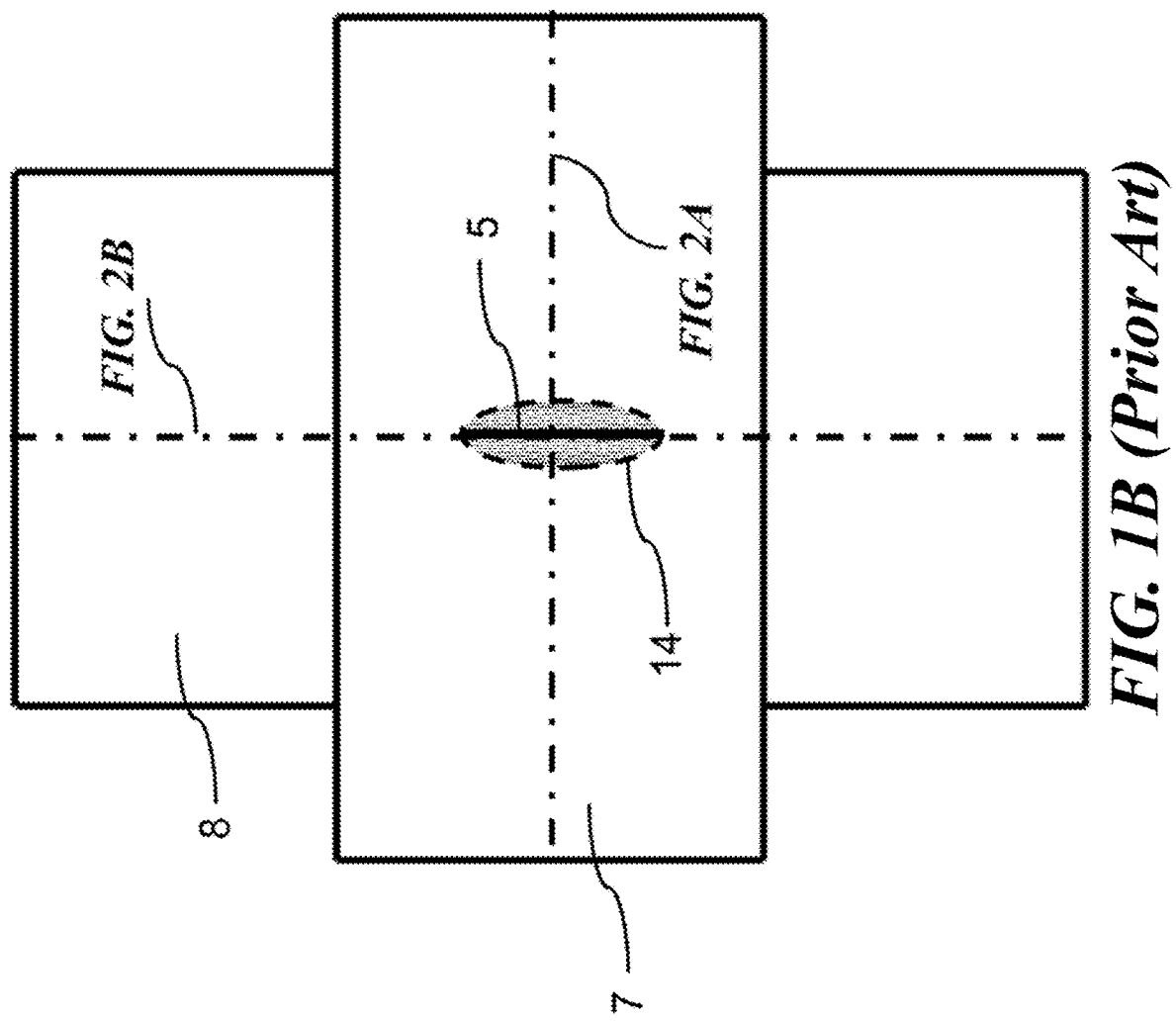

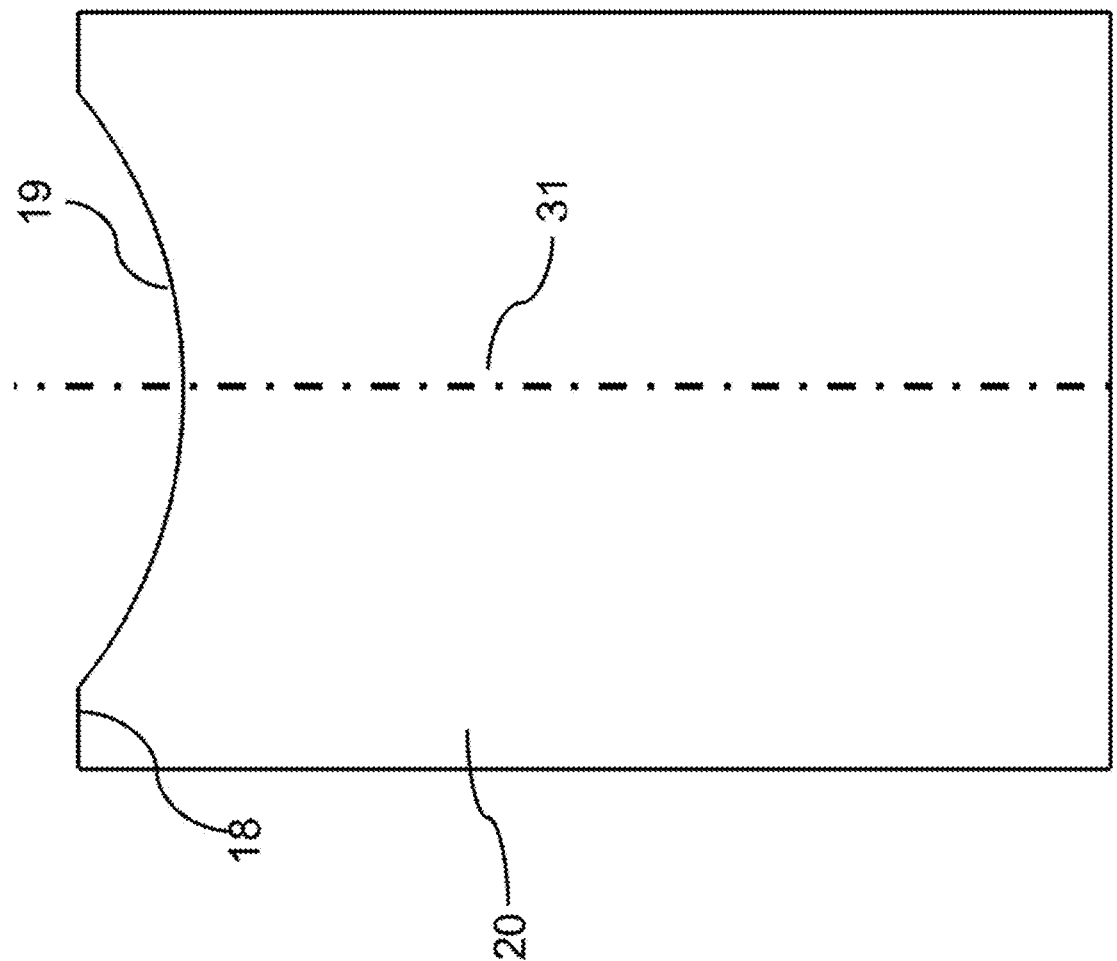

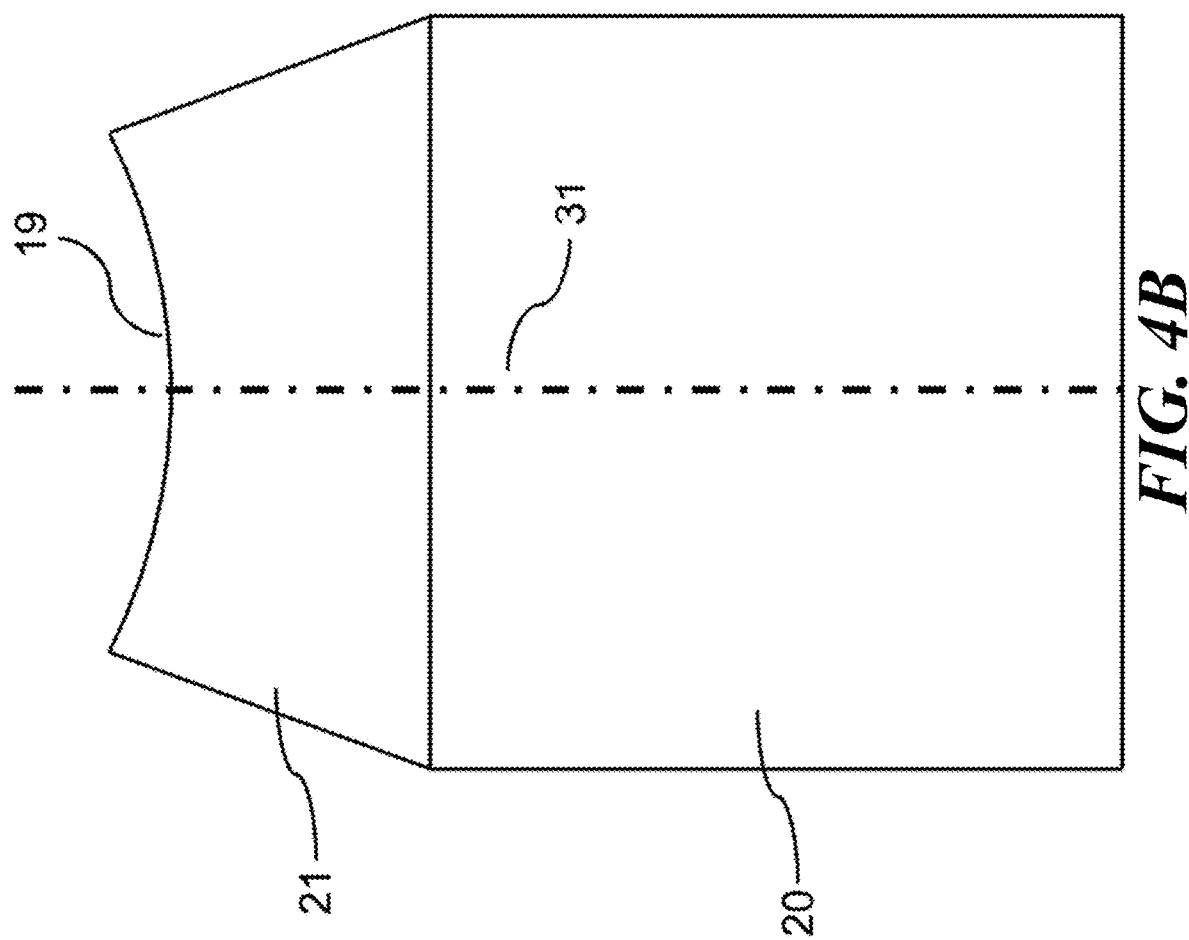

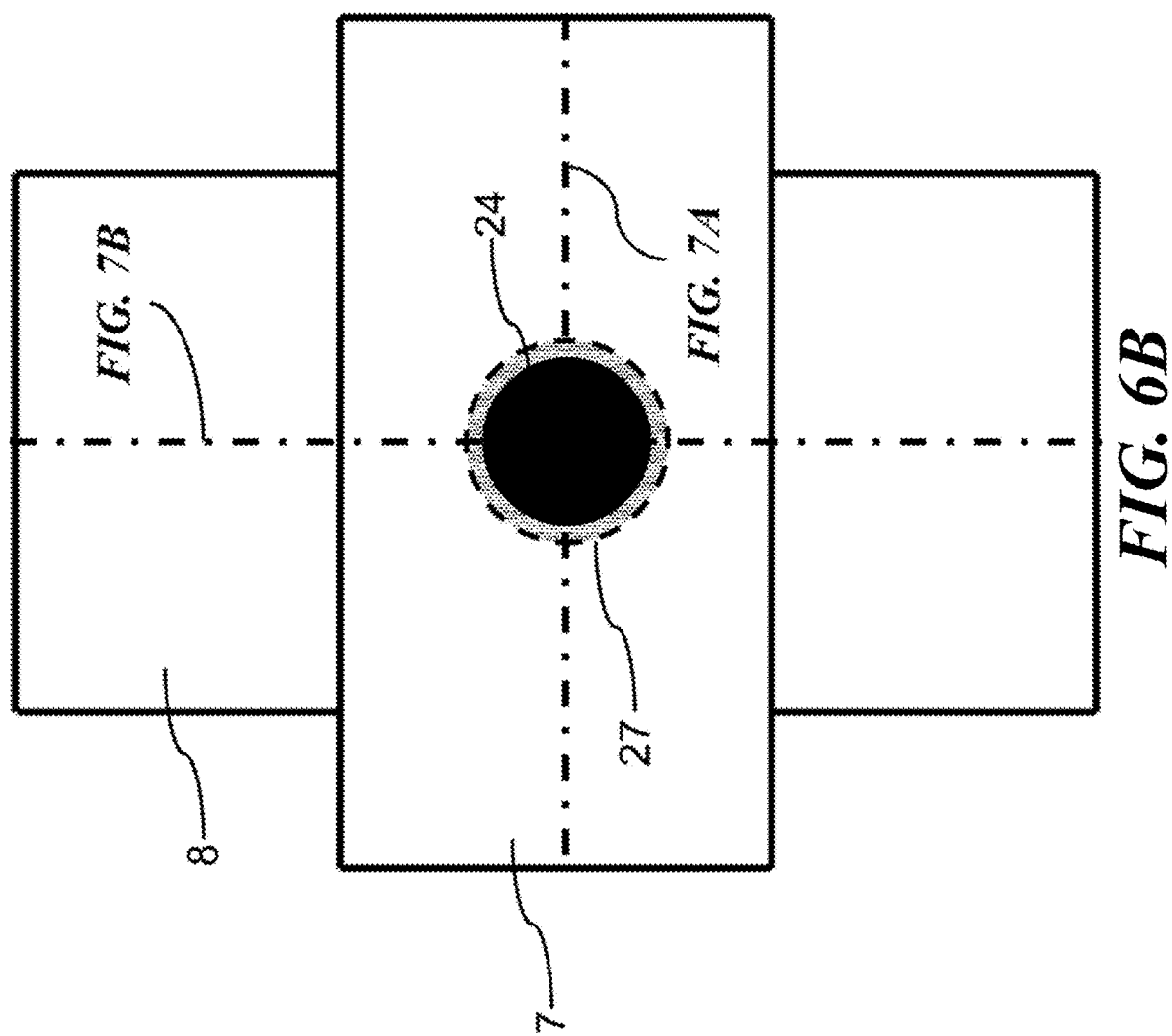

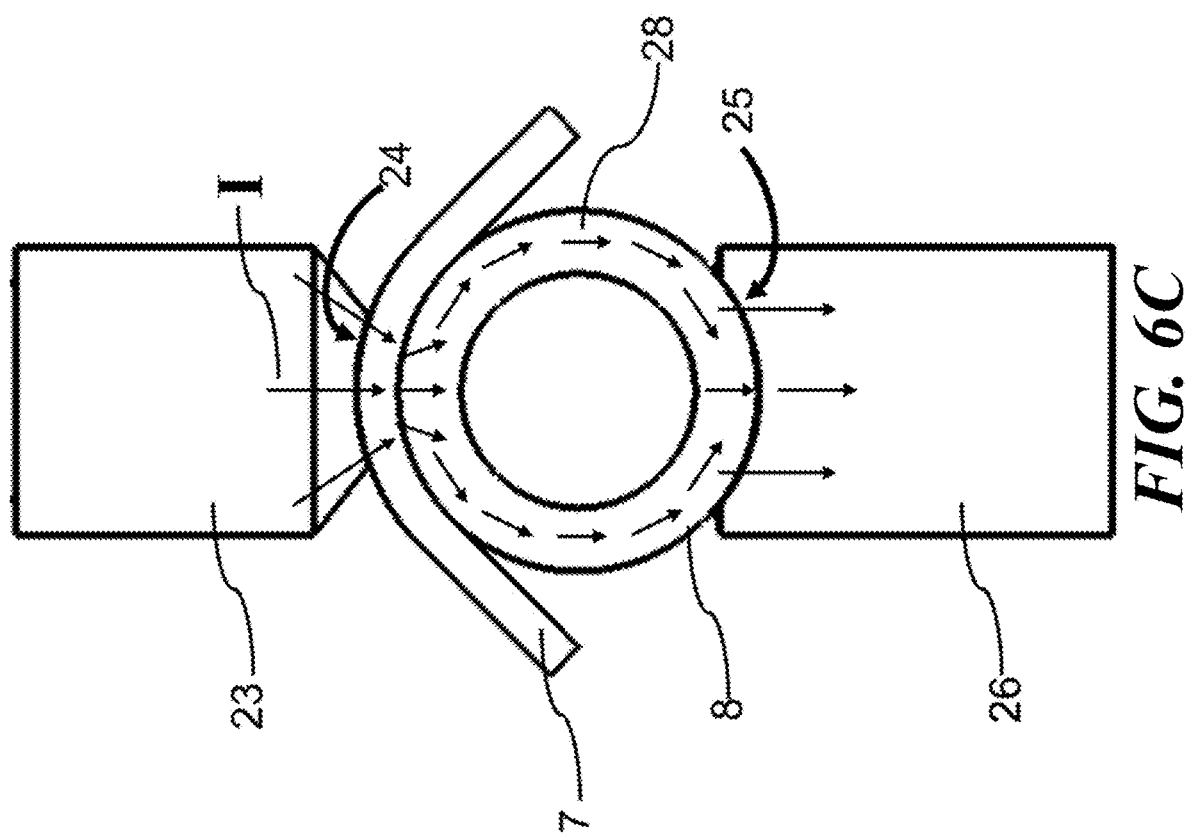

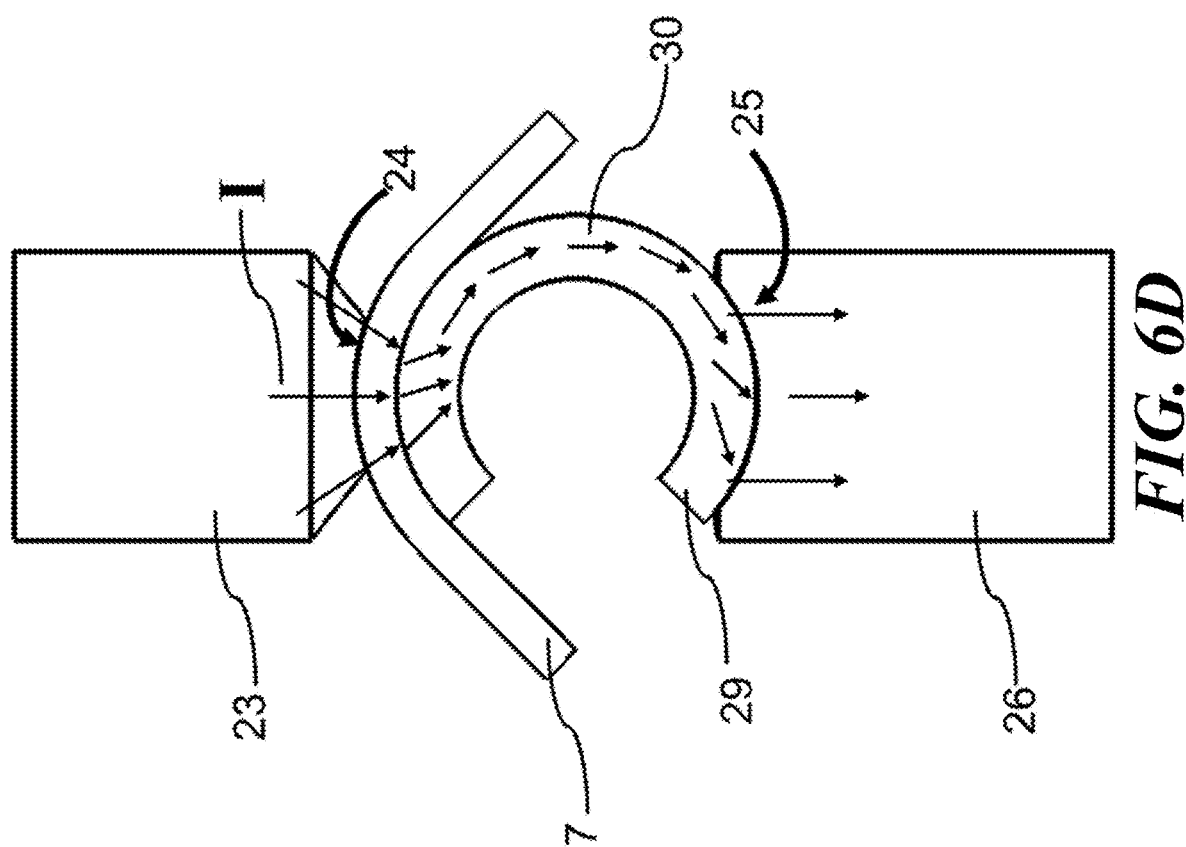

CONTOURED ELECTRODES FOR JOINING WORKPIECES WITH CURVED SURFACES

FIELD

The field of this invention pertains to welding electrodes for the formation of electrical resistance spot welds between one or more sheet metal layers with a curved surface and another metal workpiece with a curved surface and a closed section or open section. More specifically, the field of this invention pertains to welding electrodes for forming high quality weld nuggets between the workpieces with curved surfaces while simultaneously controlling welding current path around a closed section or through an open section through axially aligned and opposed welding electrodes with contoured face curvatures that match, or nearly match, the surface curvature of the contacted workpiece(s).

BACKGROUND

Resistance spot welding is a methodology of creating a joint (weld) between contacting metal surfaces by utilizing heat generated from resistance to an electrical current. Resistance spot welding utilizes a pair of electrodes to concentrate the electrical current into a controlled spot and to hold the workpieces together with an applied force. The workpieces may include metal sheets that, with the applied pressure and electrical current, typically will melt to form a molten nugget at the interface between the sheets in the area of the applied pressure and electrical current. The resolidification of the molten region creates the weld that joins the two materials together.

Resistance spot welding is commonly used in automated assembly line applications due to the efficiency and economic benefits of the method. Resistance spot welding is the primary joining process used in the automotive industry for assembling large components and automobile bodies. It is also a common method in the manufacture of domestic equipment, furniture, etc. The efficiency of resistance spot welding comes from its ability to create multiple weld spots in a short period of time, because it only melts the material in localized areas and does not create excessive heat in surrounding material. Traditionally, resistance spot welding is limited to applications on thin, flat sheets of metal stacked together, due to the force applied by axially aligned and opposed electrodes contacting the outer surfaces of the sheets being joined, to control melting and resolidification between the sheets. For the sake of simplicity, flat sheets/surfaces, as referenced in this patent, will refer to any sheet or surface that is flat, or has a sufficiently large radius so that the sheet/surface is effectively and functionally "flat".

Resistance spot welding can be used to join materials without direct access to both the outer surfaces of the sheets being joined, such as welding sheet metal parts to closed section parts, such as hydroformed parts and extrusions. Resistance spot welding can be performed by utilizing a large, grounded, backing plate or block on the part with a closed section, which functions as one of the two electrodes in a traditional RSW process, or a method utilizing two electrodes on the same side of the same material (for example, U.S. Pat. No. 10,189,111B2). Both of the aforementioned processes require flat surfaces for the electrodes and/or backing plate, and also require specialized equipment when compared to traditional resistance spot welding with axially aligned and opposed electrodes.

When traditional resistance spot welding processes and electrodes, with convex curvature or flat contact areas, are used to resistance spot weld curved sheet metal to metal parts with round closed sections, irregular weld shapes result. In the case of cylindrical geometry surfaces, the linear contact formed between the electrodes and the curved surfaces of the part, creates a weld with the shape of an elongated ellipsoid rather than a traditional circle. For particular applications, a weld of this shape may not conform to commonly utilized quality specifications, and may result in decreased performance due to the lack of symmetry in the joint. The linear contact area also creates a greater local stress, making it more likely to damage the closed round section workpiece, which can decrease the performance and/or functionality of the part.

Commonly, other welding processes, such as metal inert gas welding, tungsten inert gas, or projection welding, are required for thermally joining metal components with complicated joint geometries. These methods tend to have less geometric application limitations when compared to resistance spot welding. However, in many applications, these processes are not as economical as resistance spot welding, and can be less repeatable, leading to a higher probability of quality related issues. Thus, there is demand for advances and improvements to the methods and devices for resistance spot welding of curved sheets to closed or open curved section parts that is economically viable and of sound quality.

SUMMARY

This invention provides spot weld electrodes with contoured welding faces for specific purposes.

The welding electrode shape is designed for the formation of spot welds on one or more sheet metal layers with a curved surface and another metal workpiece with a curved surface and closed section or open section. Pairs of these electrodes, which may have identical or different geometries and/or curvatures, may be utilized on robotic, movable, or fixed equipment, with the electrodes positioned axially aligned and opposing. The electrodes would typically be used in combination with an electric power source and a weld controller, which can provide direct welding current, alternating welding current, or any other combination and/or method of applying electric current to the workpieces at a controlled level and duration.

The resistance spot welding electrodes of this invention are made of, for example but not limited to, copper-base alloys that have adequate physical and electrical properties to withstand the physical forces and electrical demands required for the formation of a resistance spot weld. The electrode comprises a section that attaches to the welding machine for current delivery, either integrating the shank into the electrode design, or having a portion that is sized to fit the separate shank portion. The part of the electrode that attaches to, or is connected with, the shank is the electrode body. The electrode body is usually cylindrical and extends from the weld shank. At the opposite end of the shank-side of the electrode body is the electrode weld face. Typically, the weld face may consist of the circular contact surface of a truncated cone, truncated dome, or flat cylinder, with the contacting surface usually consisting of a convex dome. The weld face is the part of the electrode that engages the workpieces during a resistance welding process. In accordance with this invention, the contacting weld face is altered to have a curvature that contours the workpieces to form a spot weld, accomplishing the stated objects and purposes of the invention.

The contoured curvature shape of the electrode welding face, as is covered in this invention, can be applied to any traditional spot welding electrode shape and size. The contour may be applied or maintained using a machining tool. The tool may also include cutting features for the creation or maintenance of the desired electrode geometry, including, but not limited to, truncated cone, dome, truncated dome, and/or flat cylinder. Welding setups may include one or more welding electrodes with contour curvature shaped welding faces. The welding electrodes may, or may not, have the same electrode geometries and/or weld face contoured curvature, or the presence of said features. The contoured curvature weld face is typically similar to the curvature of the part to be welded.

An embodiment of this invention is a spot welding electrode that creates an improved weld shape when welding curved sheet metal workpieces to another metal workpiece with a curved surface and closed or open section. Due to the geometry of the workpieces, when using standard resistance spot welding electrodes, the contact between the electrode and the workpiece may be a single point or a line. This relatively small contact area makes the workpieces more likely to deform, possibly decreasing performance or function. The contact area also limits the possible size and shape of the formed weld nugget, creating an ellipsoid shape, as opposed to the standard circular weld nugget formed in spot welding processes between flat sheet metal workpieces. For some resistance spot welding applications, utilizing the aforementioned workpieces, and using standard spot welding electrodes, is adequate, however, certain applications need to adhere to specific quality and design standards. Therefore, there is desire for a better performing resistance spot welding electrode for welding curved sheet metal workpieces to another metal workpiece with a curved surface and closed or open section. The contoured curvature weld face allows the electrode to have more contact area with the workpieces. This increased contact area creates a more evenly distributed pressure profile on the workpieces, decreasing the likelihood of indentation of the workpieces, and also improves the current flow and distribution which, when combined with the improved pressure profile, promotes more uniform, more circular weld nugget formation. In certain scenarios, when two different materials are spot welded together, a thin intermetallic compound may form between the materials in lieu of a weld nugget, due to the differences in thermal and electrical properties between the materials being joined. Further, there could be certain scenarios where the welding electrodes contact the workpiece on either side in a single sided manner. In these cases, surface melting could be contributing to the formation of the joint. However, for simplicity and familiarity, the joint formation in this patent will be referred to in terms of weld/nugget with opposing electrodes, although this patent and embodiments disclosed herein also apply for joining methods that do not form a traditional weld nugget.

From the aforementioned disclosure, and subsequent detailed figures and descriptions of preferred embodiments, it will be evident to those in the field of this present disclosure that this invention provides a significant advance in the technology of systems and methods for resistive spot welding of one or more sheet metal workpieces with a curved surface to another metal workpiece with a curved surface and closed section or open section.

BRIEF DESCRIPTION OF THE DRAWINGS

The below included figures are intended to illustrate certain aspects of the present disclosure, and should not be viewed or considered as exclusive embodiments of the present disclosure. The subject matter disclosed is capable of considerable modifications, alterations, combinations, and/or equivalents in form and function, without departing from the scope of this disclosure.

FIG. 1B is a top view of the curved workpiece and round, closed-section workpiece, showing the contact area and pressure area during welding on the system illustrated in FIG. 1A.

FIG. 3B is a planar view of an exemplary contoured electrode created from a flat or large radius spot welding electrode.

FIG. 4B is a planar view of an exemplary contoured electrode created from a domed or chamfered/truncated spot welding electrode, with a high chamfer angle.

FIG. 6B is a top view of the curved workpiece and round, closed-section workpiece, showing the contact area and pressure area during welding on the system illustrated in FIG. 6A.

FIG. 6C is an illustration of the current path for a direct-current welding operation on the system illustrated in FIG. 6A.

FIG. 6D is an illustration of the current path for a direct-current welding operation for joining a curved workpiece to a round, open-section workpiece, utilizing contoured spot welding electrodes.

DETAILED DESCRIPTION

Figure 1A:
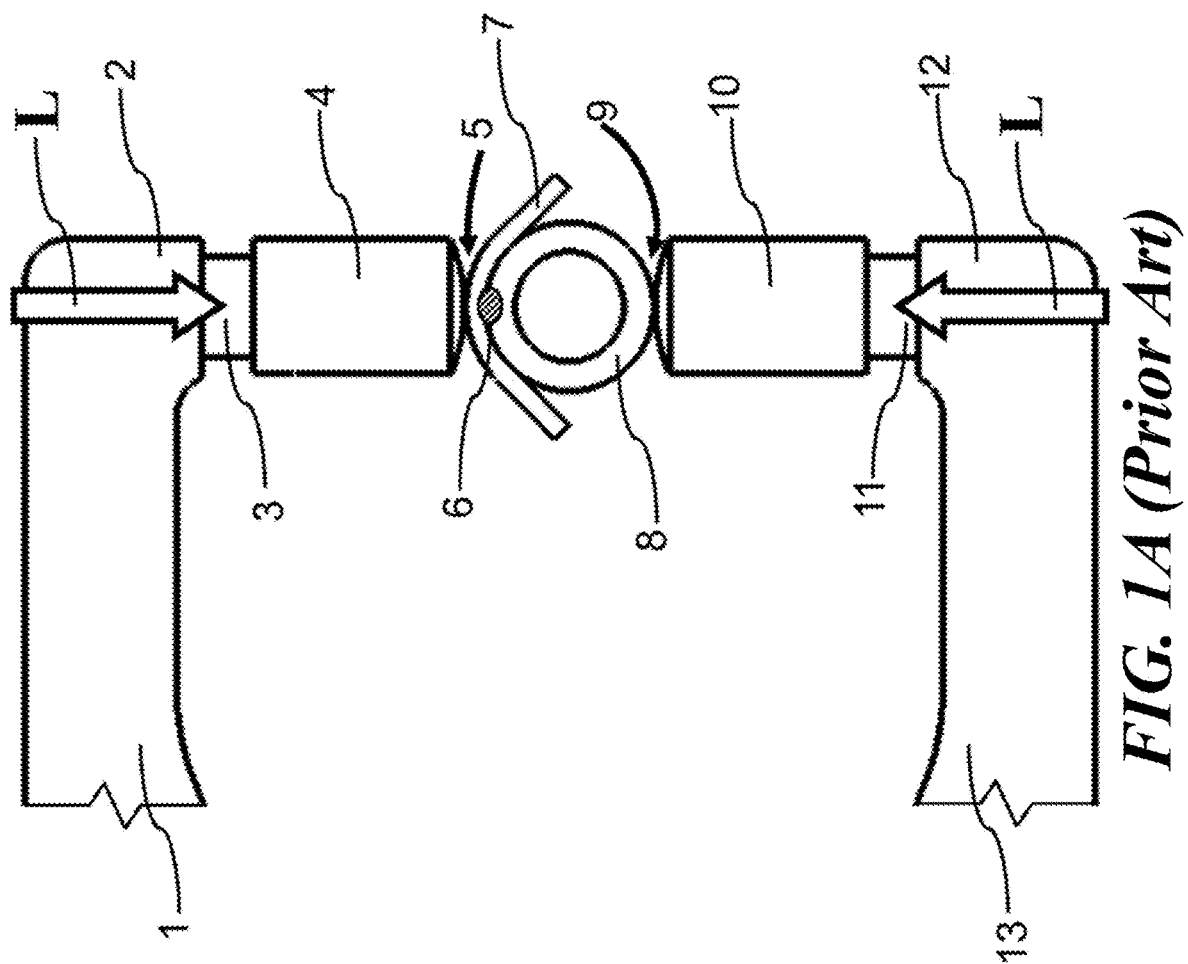
FIG. 1A is a side view schematic representation of a welding machine during a traditional welding operation, joining a curved workpiece to a round, closed-section workpiece utilizing standard spot welding electrodes.

The present disclosure is related to resistance spot welding equipment and methods of use and, more particularly, to a resistance spot welding electrode design containing a contoured curvature weld face for improved weld quality.

Embodiments discussed herein describe improvements to resistance spot welding electrode designs that are useful for the formation of spot welds on any weldable workpieces. The first embodiment of this invention provides spot welding electrodes with contoured curvature weld faces that are effective at producing quality welds on curved metal workpieces with closed or open sections. The electrodes consist of, at one end, a portion that attaches to, or is integral with, an electrode shank, followed by the body of the electrode, and a weld face with a contoured surface on the end opposite the shank. The electrode body may be a multitude of shapes, but is typically cylindrical. The contoured curvature weld face can be created on any traditional weld face geometry, including, but not limited to, a truncated cone, a truncated dome, and a flat cylinder with or without convex radii. The contoured curvature is intended to fit, or nearly fit, the curvature of the workpieces to be welded.

Embodiments disclosed herein also describe methods of using the electrodes with contoured curvature for the creation of spot welds between curved weldable workpieces and curved weldable workpieces with closed or open section with improved weld shape. Such methods may include using welding apparatus, which may be robotic or non-robotic, to deliver a predetermined amount of electrical energy (current) for a predetermined amount of time and at a predetermined pressure.

The presently disclosed embodiments provide a contoured curvature weld electrode face, which assists in the formation of spot welds with improved shape by controlling current distribution and pressure through surface contact area. The contoured curvature achieves larger, and more circular, contact area with the curved workpieces. The increased contact area decreases the pressure where the electrode meets the workpiece. The lower pressure makes the workpieces less likely to deform during the welding process. The larger area also creates a larger pressurized zone in which the weld nugget can be formed and grow before reaching expulsion limits. The larger pressure zone works symbiotically with the larger contact area, which allows for better current distribution at the electrode tips to allow the formation of a sufficiently large and regularly shaped weld nugget. In some cases, better current distribution and heat flow may also be achieved by exertion of force or current on either side in a single sided manner. Workpiece considerations that can influence the optimal contoured curvature weld face include, but are not limited to: workpiece geometries, quantity of workpieces, material grades, material thicknesses, material coatings, and workpiece function/applications.

In contrast to conventional spot welding tools and methods, the presently disclosed embodiments may be used on existing, traditional, spot welding equipment, as the contoured tips can be used on any resistance spot welding equipment with interchangeable welding electrodes. In addition, the presently disclosed embodiments improve the weld shape in comparison to conventional spot welding electrodes, which create non-circular welds, and possibly indents, that may not be acceptable under the applicable weld standards for a project, as indentation into the curved closed or open section workpiece may impede performance and function, and non-circular welds may have anisotropic properties, leading to unpredictable and not uniform performance. Furthermore, the presently disclosed embodiments form a nugget that meets the strength and internal quality requirements for a given project.

FIG. 1A illustrates an exemplary traditional welding operation, using traditional electrodes 4 and 10, to form a spot weld at the weld location 6 between a curved sheet metal workpiece 7 and a curved, closed section workpiece 8. The welding apparatus consists of an upper weld gun arm 1 which has an electrode holder 2 that holds a standard electrode 4 using an electrode shank 3. Cooling of the electrodes, by water or any other cooling method or agent, is often done, and may or may not be utilized in these embodiments, however, the methods and equipment are not illustrated. The upper weld gun arm 1 is attached to a welding apparatus, not shown, which may be various types of robotic or non-robotic welding apparatuses, and may include any type of welder capable to provide the required welding pressure and current for the desired application. The welder may be servo driven, pneumatic driven, or any other type of welder that can perform similar techniques. The current flowing through the welder could be direct current (DC), alternating current (AC), or any other combination and/or method of applying electric current to the workpieces. Similar to the upper weld gun assembly, a lower weld gun arm 13 is also attached to the welding apparatus. The lower weld gun arm 13 also contains an electrode holder 12, which holds the lower electrode 10 using a shank 11.

Figure 1C:
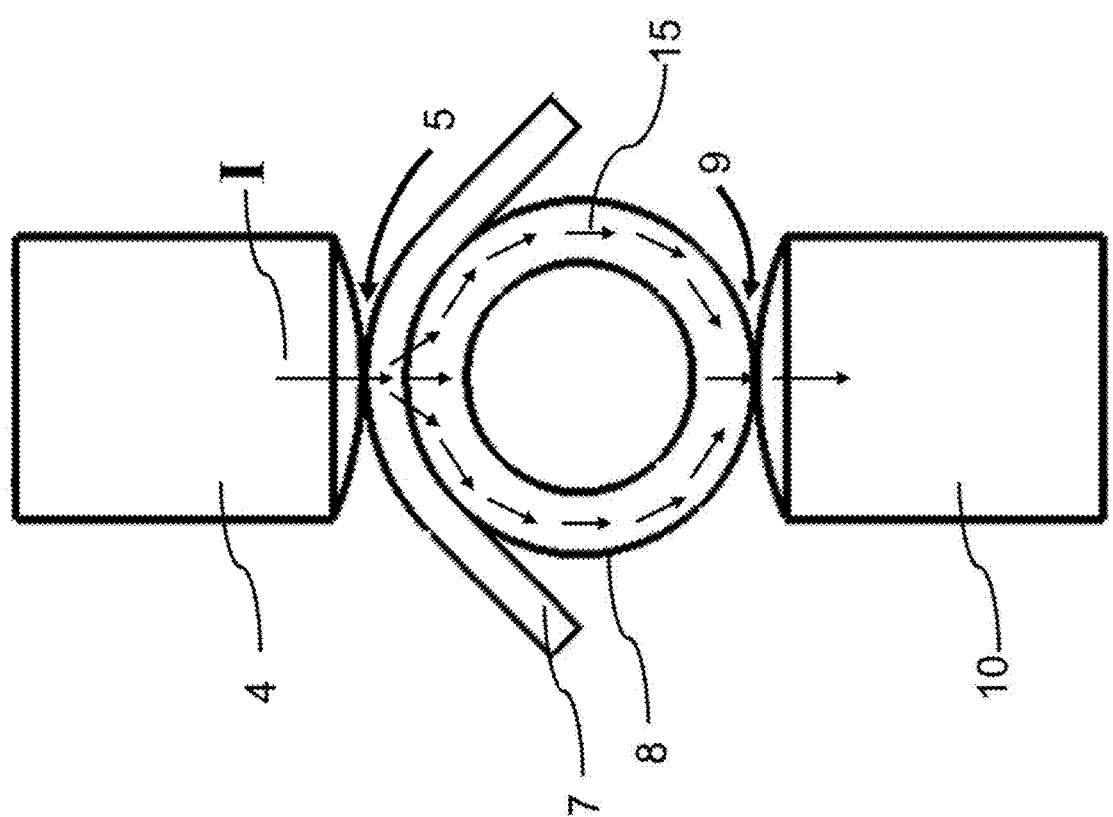
FIG. 1C is an illustration of the current path for a direct-current welding operation on the system illustrated in FIG. 1A.

During the spot welding operation in FIG. 1A, welding electrode 4, held by the upper weld gun arm 1 engages the outer (upper) surface of the curved workpiece 7 with the contact area 5 and welding electrode 10, held by the lower weld gun arm 13 engages the outer (lower) surface of the curved, closed section workpiece 8 with the contact area 9. The welding apparatus applies a force L between the electrodes 4, 10 suitably, based on the predetermined pressure schedule, to press the workpieces 7, 8 together and create the area for a weld nugget 6 to be formed. FIG. 1B is a top down view of the welding process illustrated in FIG. 1A. The geometry of the upper electrode 4 and the curved workpiece 7 creates narrow point of contact 5 resulting in a small, elliptical pressure envelope 14 in which a weld nugget 6 can be formed and contained, without expulsion occurring. Current is passed between the axially aligned and opposing electrodes 4, 10 and through the workpieces 7, 8 at contact points 5, 9, and through the weld nugget 6 location. FIG. 1C illustrates an exemplary current path 15, as described above. The current I is illustrated as being a direct current flow, with the upper electrode 4 being of negative polarity, and the lower electrode 10 being of positive polarity, however, the embodiments apply to any current type or welding apparatus polarity. The geometry of the electrodes 4, 10 and the workpieces 7, 8 creates narrow points of contact 5, 9 resulting in focused current density at the contact areas 5, 9. A predetermined amount of current is applied in the welding operation and a suitable amount of resistive heating occurs at the weld nugget location 6, which melts the metal in the current path. The welding current is stopped after a predetermined amount of time, and the weld nugget 6 rapidly cools by diffusing heat into the rest of the workpieces 7, 8 and the electrodes 4, 10, with or without the assistance of cooled electrodes, by water or any other cooling agent or method. The resolidification of the molten region is what forms the joint between the workpieces. After the welding process, the electrodes or workpieces may be moved, and subsequent welds can be formed at nearby weld sites.

Figure 2A:
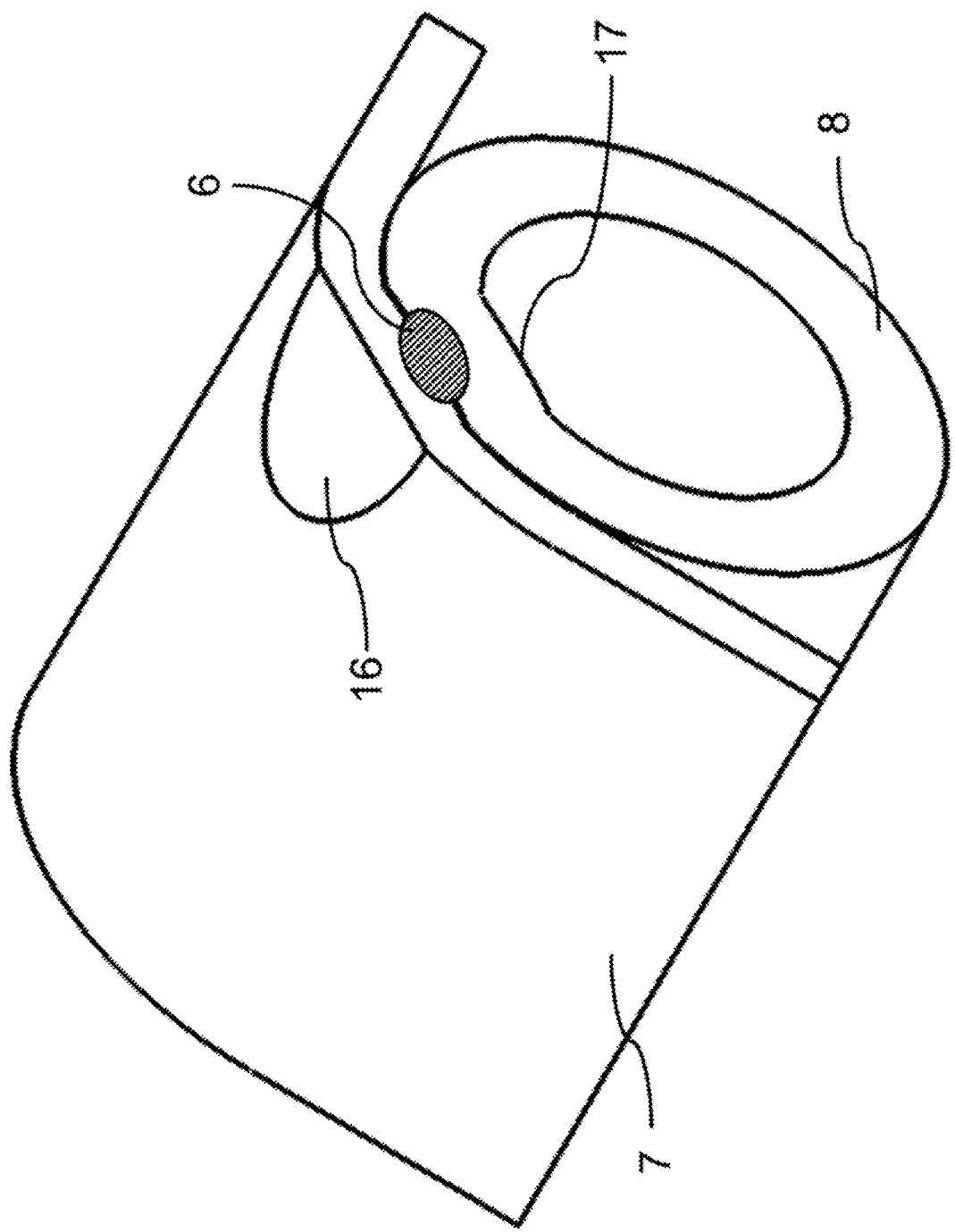
FIG. 2A is an isometric schematic of an exemplary cross-section in the transverse direction for a weld between a curved workpiece and a round, closed-section workpiece made using the system illustrated in FIG. 1A.
Figure 2B:
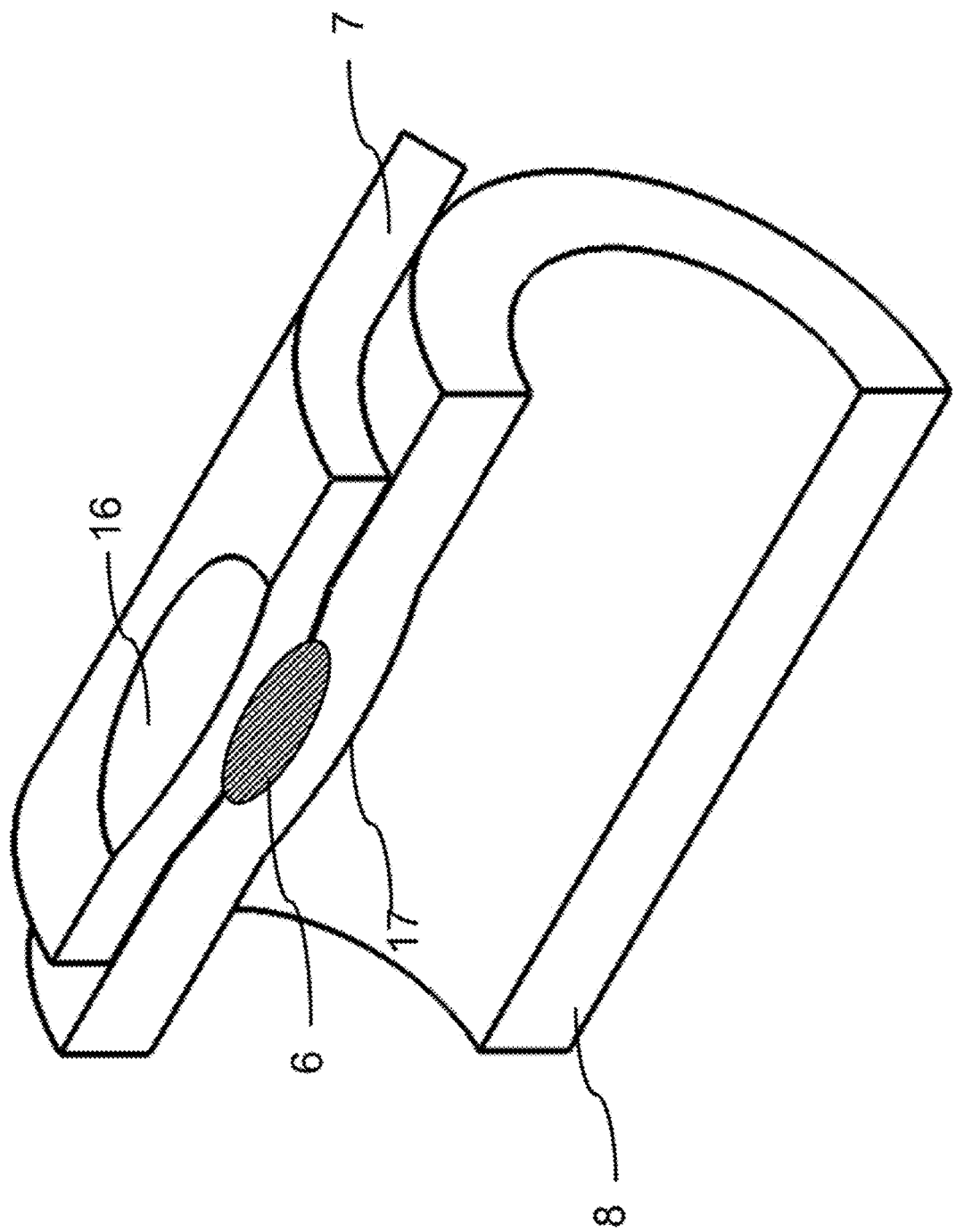
FIG. 2B is an isometric schematic of an exemplary cross-section in the longitudinal direction for a weld between a curved workpiece and a round, closed-section workpiece made using the system illustrated in FIG. 1A.

FIGS. 2A and 2B illustrate schematic exemplary cross-sectional results from the welding operation illustrated in FIG. 1A. FIGS. 2A and 2B show isometric schematic cross-sections in both the transverse and longitudinal cross-section directions. The limited contact area 5 between the upper electrode 4 and the curved workpiece 7 leads to a notable indent in the curved workpiece 16, which can also indent into the interior part of the curved, closed section workpiece 8. The interior indent 17 may impede the intended function of the part, such as the threading of a bolt, and/or decrease the performance due to the compromised structure. This indent happens due, in part, to the narrow point of contact situation illustrated in FIG. 1B. Further the minimal contact area and concentrated current flow inherent to the geometries of this welding operation creates a weld nugget 6 which is notably ellipsoid in shape, being much narrower in the transverse direction of FIG. 2A and longer in the longitudinal direction, shown in FIG. 2B. These dimensions and lack of uniformity may cause the weld to fail common quality standards for particular applications, and may also lead to decreased and/or anisotropic performance. As described above and in the mentioned figures, the weld face has great implications on the pressure profile and current distribution during the welding process, both of which affect the dimensions and quality of the weld nugget and workpiece assembly.

In the first embodiment of this invention, an electrode geometry is provided that is designed to be suitable for welding workpieces with curved surfaces to curved surfaces with closed or open sections. The geometry should be able to produce quality welds over a range of workpiece geometries, quantity of workpieces, material grades, material thicknesses, and material coatings by utilizing contoured weld face that matches, or nearly matches, the curvature of the workpiece(s) to be welded. The electrode shares some characteristics with traditional electrodes used for spot welding steel or aluminum, but provides the novel feature of a contoured weld face that has never been used before.

The new electrode face geometry was designed with a contoured curvature on multiple possible electrode body designs. Reference is made to FIGS. 3A to 5B. The contoured weld face is designed to meet several application requirements. First, it is preferred that the electrodes do not make excessive indent into the workpieces. Excessive indent, or metal thinning, will weaken the weld, and excessive indent into a workpiece with a closed or open section may impede the function of the part, such as damaging threads for bolts. The other requirement is that the electrodes promote and allow nugget growth to form a regular shaped nugget that is sufficiently large to meet commonly accepted quality specifications. There are established spot weld dimension standards for particular applications that require welds be a certain size and geometry to achieve adequate strength. Undersized welds or welds with irregular geometries may not achieve the performance requirements in all directions. An additional benefit of this invention is the improved workpiece alignment in comparison to standard electrodes. The similar contoured curvature of the electrodes to the workpiece(s) helps to keep all pieces in-line to further promote the formation of a quality weld in the correct location. The contoured electrode design of this invention achieves the aforementioned requirements.

Figure 3A:
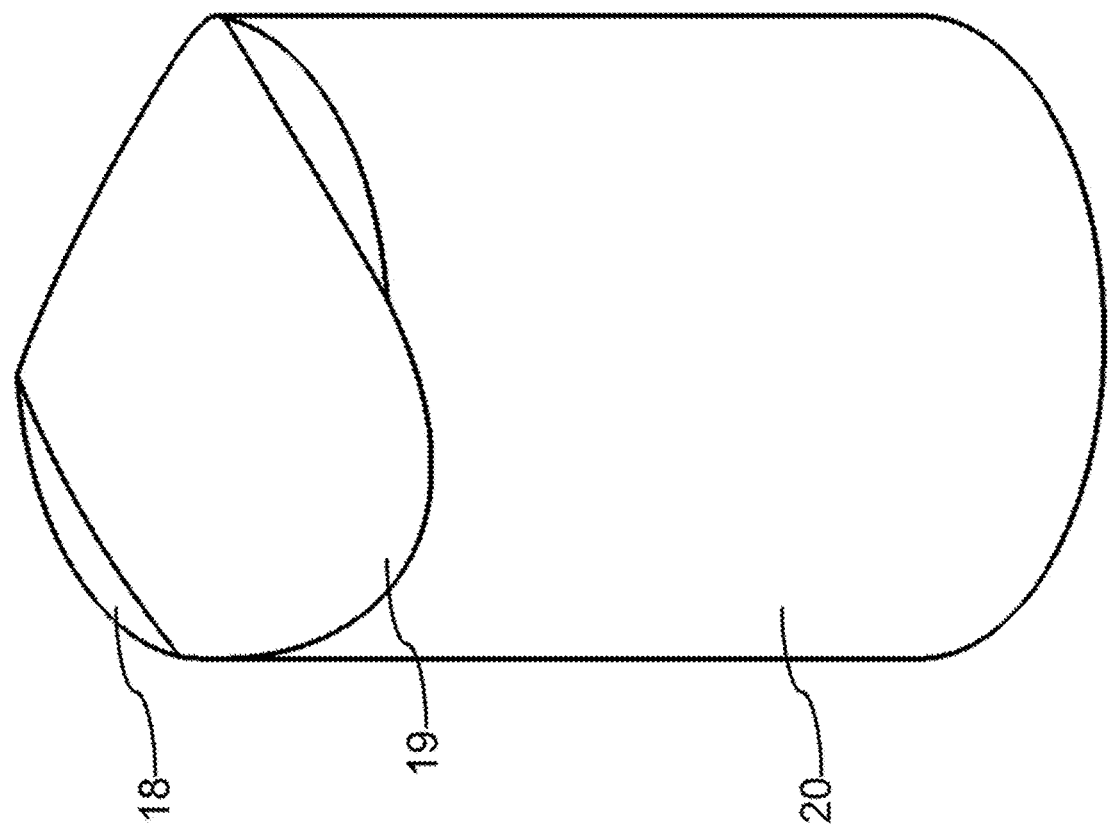
FIG. 3A is an isometric view of an exemplary contoured electrode created from a flat or large radius spot welding electrode.
Figure 4A:
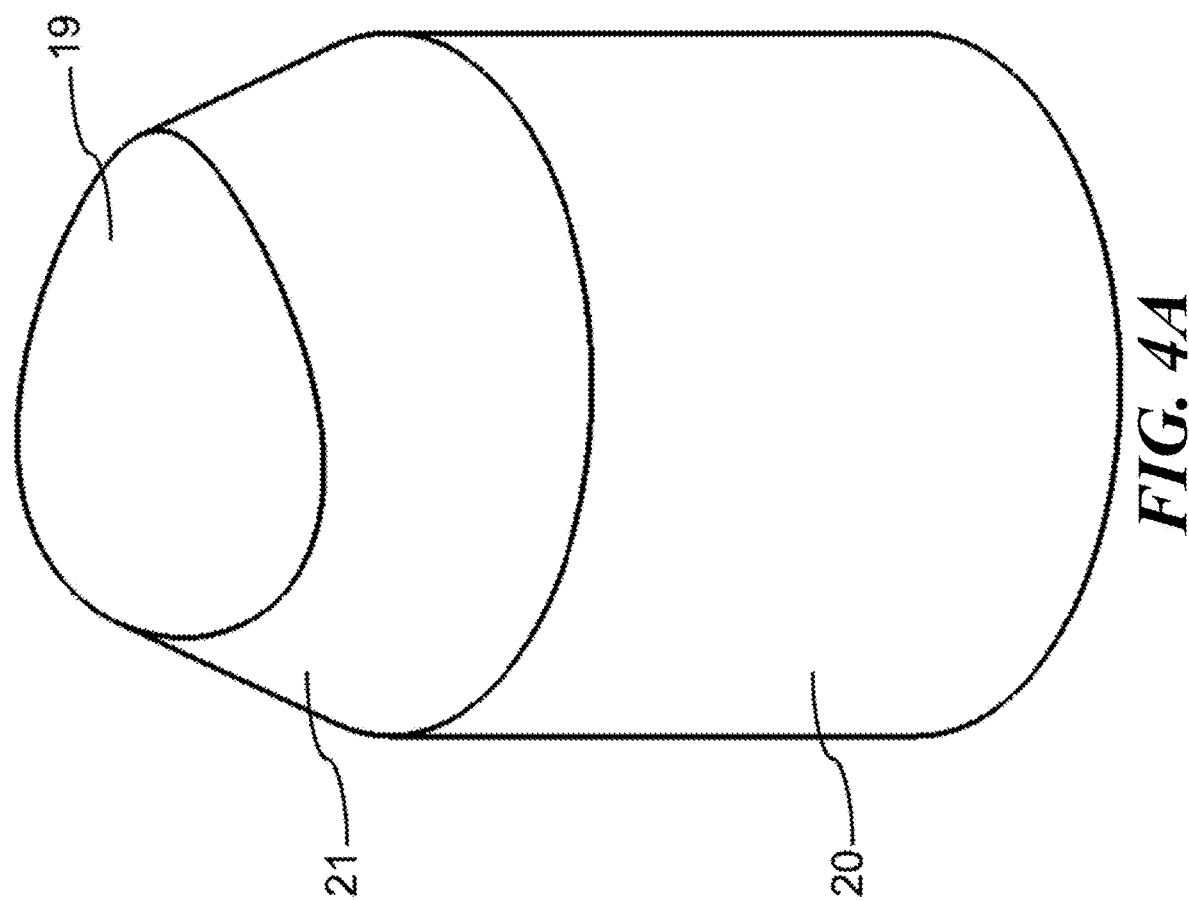
FIG. 4A is an isometric view of an exemplary contoured electrode created from a domed or chamfered/truncated spot welding electrode, with a high chamfer angle.
Figure 5A:
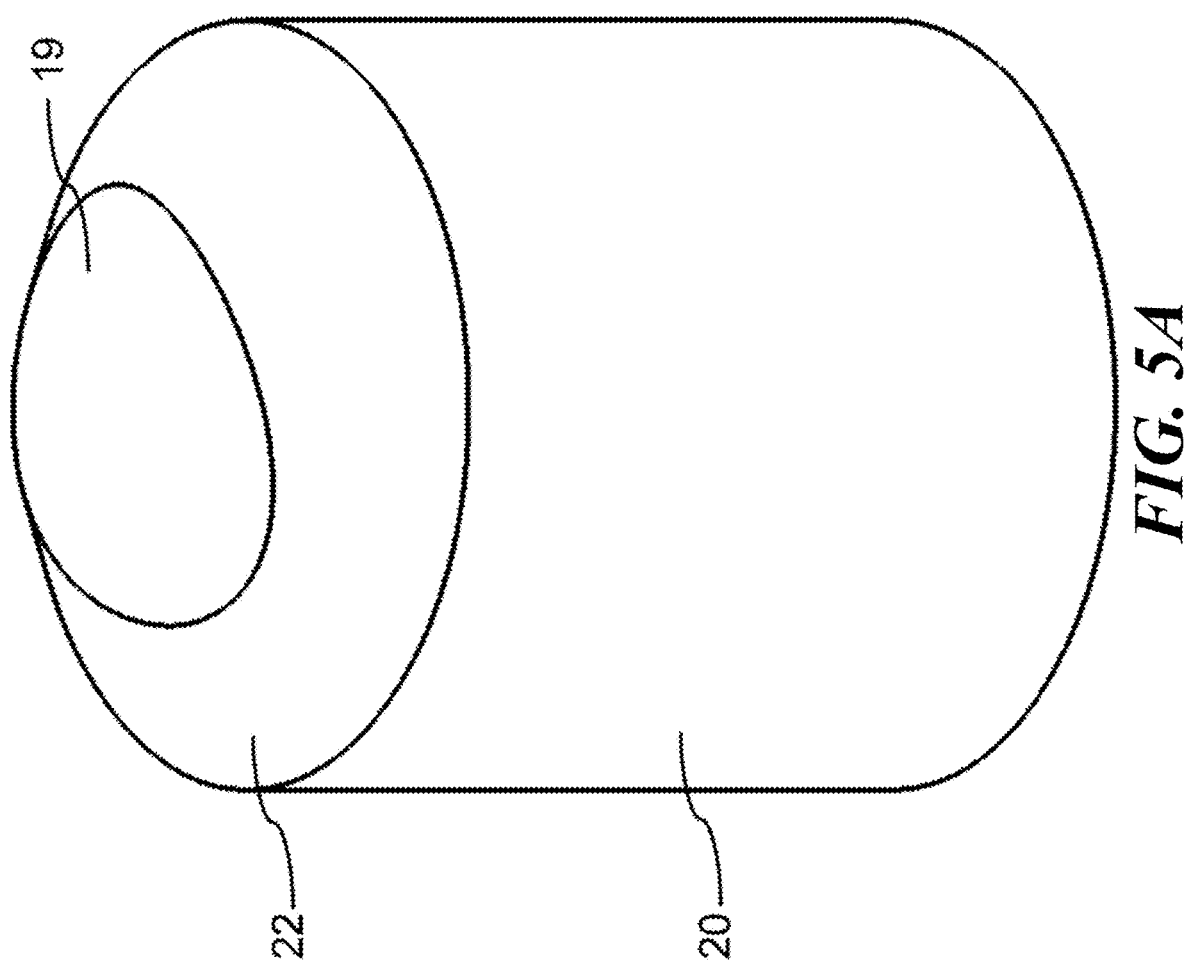
FIG. 5A is an isometric view of an exemplary contoured electrode created from a domed or chamfered/truncated spot welding electrode, with a low chamfer angle.
Figure 5B:
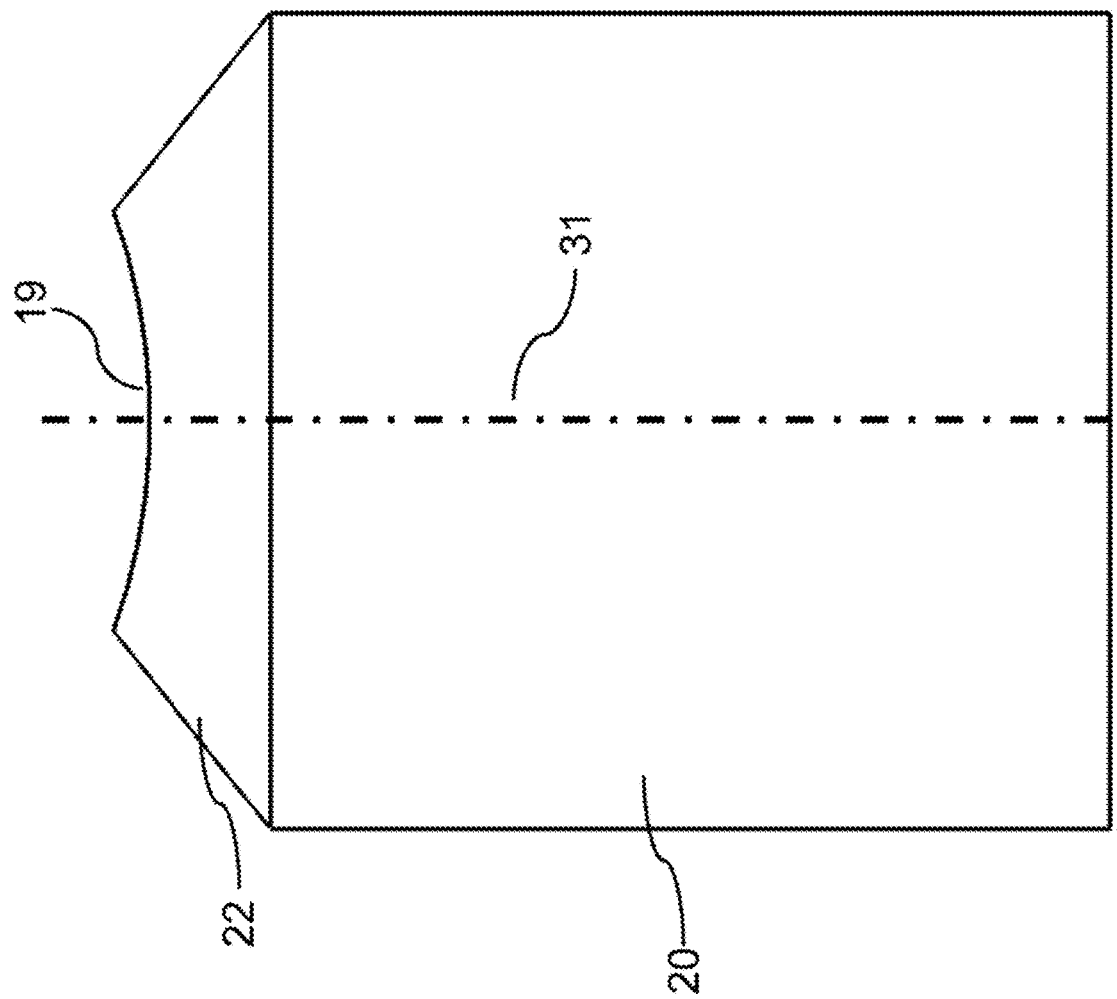
FIG. 5B is a planar view of an exemplary contoured electrode created from a domed or chamfered/truncated spot welding electrode, with a low chamfer angle.

As mentioned above, the contoured curvature can be applied to multiple electrode body designs. FIGS. 3A to 5B contain some exemplary electrode geometries, as covered in the embodiments of this invention. Possible applications of the design and embodiments of this invention include, but are not limited to, the designs illustrated in FIGS. 3A to 5B. FIGS. 3A and 3B illustrate isometric and planar views of an exemplary contoured curvature applied to a flat, or mostly flat, electrode. The electrode body 20 terminates with a flat surface 18, although the surface may have a convex curvature, which is another common electrode geometry. The contoured weld face 19 is configured to achieve an electrode design with a significantly large contact area. The illustrated contoured weld face 19 is centered on the electrode, however, it may be applied at any location or angle. The illustrated contoured weld face is in the form of a straight concave groove that is perpendicular to the longitudinal axis 31 of the electrode body 20 but any other suitable geometry can alternatively be utilize. Further, the orientation of the concave groove may or may not be perpendicular to the longitudinal axis of the electrode body, so long as the concave groove area sufficiently contacts the curved surface(s) of the workpiece(s) to be joined in the welding process. The radius of the contoured weld face 19 is intended to match, or be similar to, the curvature of the workpiece to be welded that the electrode is contacting so that contact area is increased. FIGS. 4A and 4B illustrate isometric and planar views of an exemplary contoured curvature on an electrode with a steep truncated cone body geometry. The electrode body 20 terminates in a contoured weld face 19, but has a steep degree chamfer 21 to decrease the contact area of the electrode. Larger weld faces require more power to create a weld nugget, and in the case of welding a curved workpiece to a curved workpiece with a closed or open section, too large of a weld face can result in forming a ring-shaped weld nugget, which is not desirable, as it fails many commonly accepted quality specifications and may result in decreased performance. FIGS. 5A and 5B illustrate isometric and planar views of an exemplary contoured curvature on an electrode with a mild truncated cone body geometry. The electrode body 20 terminates in a contoured weld face 19, but has a mild degree chamfer 22 to decrease the contact area of the electrode further. Again, this may be required by the application to achieve a desired weld. Multiple different electrode geometries can be used in any configuration to achieve adequate welds on the workpieces.

Figure 6A:
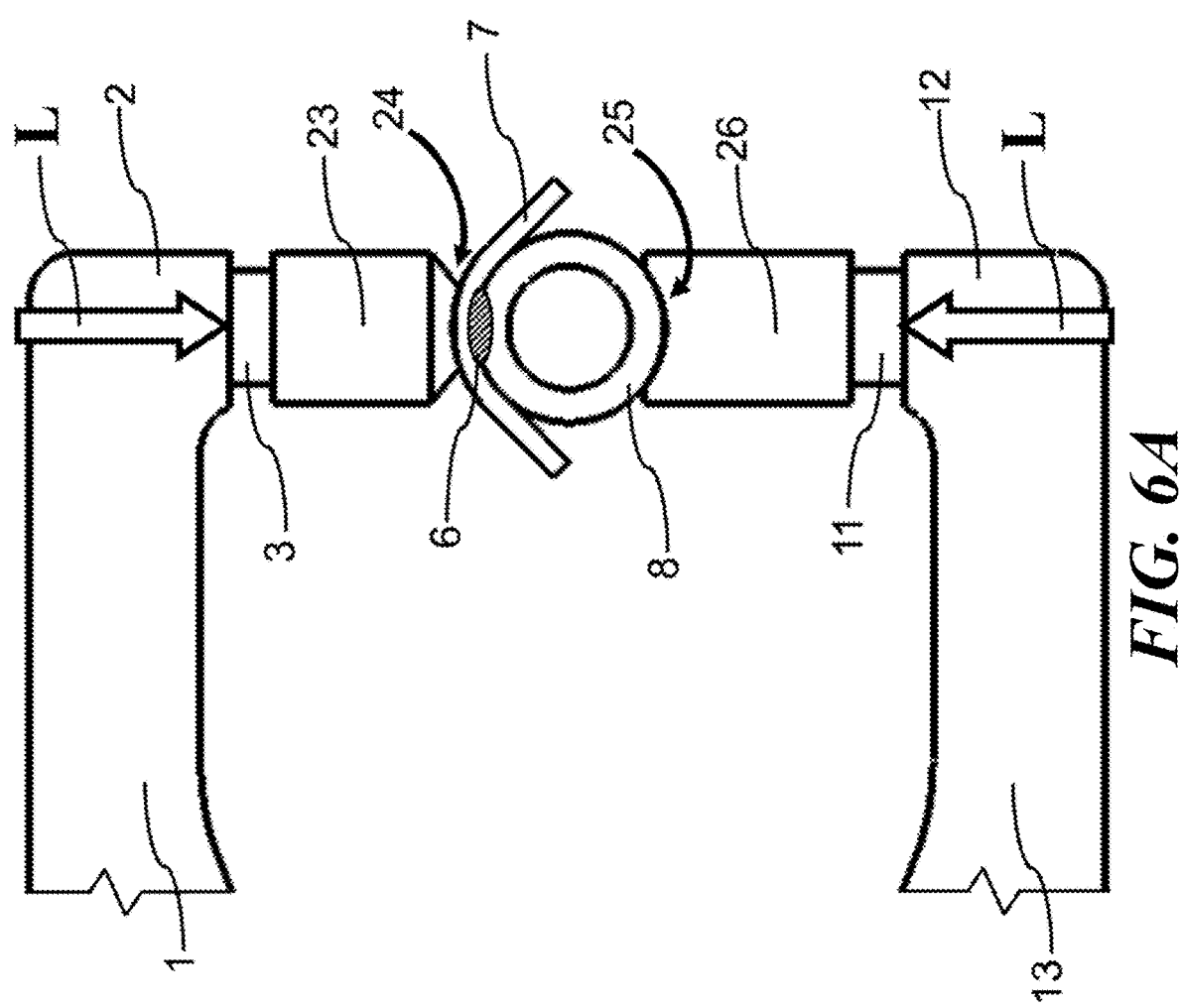
FIG. 6A is a side view schematic representation of a welding machine during a welding operation included in the embodiments of this invention, joining a curved workpiece to a round, closed-section workpiece utilizing contoured spot welding electrodes.

FIG. 6A illustrates an exemplary welding operation, using the contoured electrodes 23 and 26 of this invention, to form a spot weld at the weld location 6 between a curved sheet metal workpiece 7 and a curved, closed section workpiece 8. The illustration includes electrodes of different geometries, as an example, to show the combinations that can be utilized to achieve a desired weld. The welding apparatus consists of an upper weld gun arm 1 which has an electrode holder 2 that holds a truncated cone contoured electrode 23 using an electrode shank 3. Cooling of the electrodes, via water or any other agent or method, is often done, and may or may not be utilized in these embodiments, however, the methods and equipment are not illustrated. The upper weld gun arm 1 is attached to a welding apparatus, not shown, which may be various types of robotic or non-robotic welding apparatuses, and may include any type of welder capable to provide the required welding pressure and current for the desired application. Similar to the upper weld gun assembly, a lower weld gun arm 13 is also attached to the welding apparatus. The lower weld gun arm 13 also contains an electrode holder 12, which holds the flat cylinder electrode with a contour 26 using a shank 11.

During the spot welding operation in FIG. 6A, welding electrode 23, held by the upper weld gun arm 1 engages the outer (upper) surface of the curved workpiece 7 with the contact area 24 and welding electrode 26, held by the lower weld gun arm 13 engages the outer (lower) surface of the curved, closed section workpiece 8 with the contact area 25. The welding apparatus applies a force L between the electrodes 23, 26 suitably, based on the predetermined pressure schedule, to press the workpieces 7, 8 together and create the area for a weld nugget 6 to be formed. FIG. 6B is a top down view of the welding process illustrated in FIG. 6A. The geometry of the upper electrode 23 and the curved workpiece 7 creates mostly circular contact area 24 resulting in a large, more circular pressure envelope 27 in which a weld nugget 6 can be formed and contained, without expulsion occurring. Current is passed between the axially aligned and opposing electrodes 23, 26 and through the workpieces 7, 8 at contact points 24, 25, and through the weld nugget 6 location. FIG. 6C illustrates an exemplary current path 28, as described above. The current I is illustrated as being a direct current flow, with the upper electrode 23 being of negative polarity, and the lower electrode 26 being of positive polarity, however, the embodiments apply to any current type or welding apparatus polarity. The geometry of the electrodes 23, 26 and the workpieces 7, 8 creates large areas of contact 24, 25 resulting in a more distributed current density at the contact areas 24, 25. A predetermined amount of current is applied in the welding operation and a suitable amount of resistive heating occurs at the weld nugget location 6, which melts the metal in the current path. The welding current is stopped after a predetermined amount of time, and the weld nugget 6 rapidly cools by diffusing heat into the rest of the workpieces 7, 8 and the electrodes 23, 26, with or without the assistance of water-cooled electrodes. The resolidification of the molten region is what forms the joint between the workpieces. After the welding process, the electrodes or workpieces may be moved, and subsequent welds can be formed at nearby weld sites. FIG. 6D illustrates an exemplary current path 30 for the welding situation described above, conducted on a curved workpiece with an open-section 29.

Figure 7A:
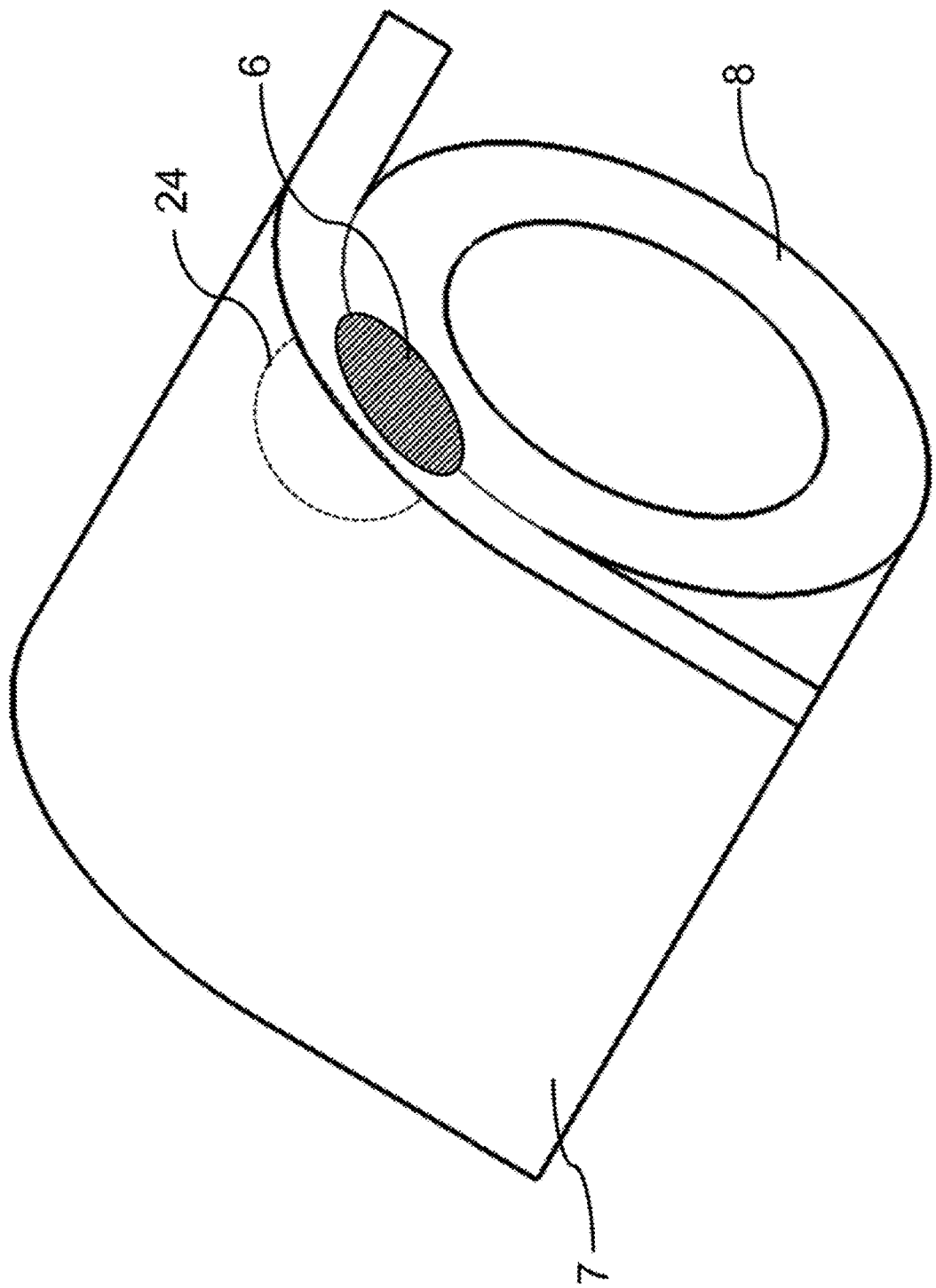
FIG. 7A is an isometric schematic of an exemplary cross-section in the transverse direction for a weld between a curved workpiece and a round, closed-section workpiece made using the system illustrated in FIG. 6A.
Figure 7B:
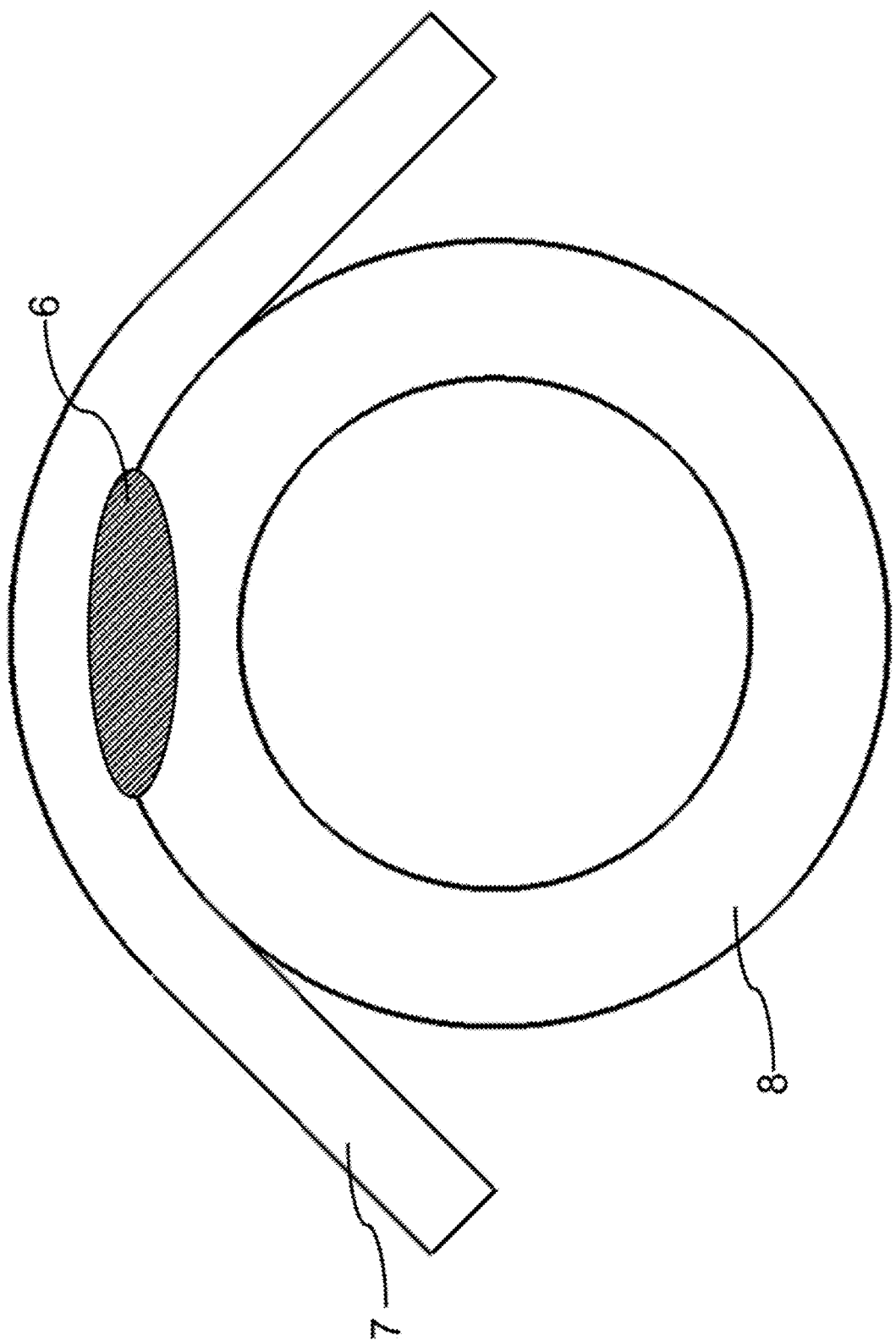
FIG. 7B is an isometric schematic of an exemplary cross-section in the longitudinal direction for a weld between a curved workpiece and a round, closed-section workpiece made using the system illustrated in FIG. 6A.

FIGS. 7A and 7B illustrate schematic exemplary cross-sectional results from the welding operation illustrated in FIG. 6A. FIGS. 7A and 7B show isometric schematic cross-sections in both the transverse and longitudinal cross-section directions. The increased contact area 24 between the upper electrode 23 and the curved workpiece 7, when compared to the traditional electrodes in FIGS. 1A and 2B, leads to little or no indent in the curved workpiece, and no indent into the interior part of the curved, closed or open section workpiece 8. Therefore, there is no decrease in performance or function utilizing the contoured electrodes. The lack of indentation is due, in part, to the situation illustrated in FIG. 6B. The increased contact area and improved current flow inherent to the geometries of this welding operation creates a weld nugget 6 which is able to grow equally in all directions, creating a much more circular weld shape, leading to improved nugget symmetry between the transverse direction, shown in FIG. 7A and the longitudinal direction, shown in FIG. 7B. The formed weld geometry is similar to the weld formed in a standard resistance spot welding process between two flat sheets of metal. The uniformity of the weld yields isotropic and predictable mechanical properties for the joint.

As described above, this new proposed electrode design has significant advantages over traditional electrode designs when used for welding curved workpieces to curved workpieces with closed or open sections. However, certain design considerations that need to be taken into account for maximized benefit of the invention. First, the electrode curved contoured weld face needs to be sufficiently sized to achieve a good quality weld. If the weld face is too small, the nugget size may be inadequate, due to the small pressure envelope not allowing the nugget to grow without expulsion, and/or indentation into the curved workpiece and/or inside of the curved workpiece with closed or open section may occur. If the weld face is too large, it may take appreciably more power to form an adequate weld, and a ring-shaped weld, or other issues, may occur. Similarly, the radius of the contoured curvature needs to be appropriately sized for the application. Too small of a curvature will increase the likelihood of indentation into the workpieces or may cause the welding apparatus to not work properly due to poor contact area. If the curvature is too large, the contact area will decrease, resulting in a situation more similar to using traditional electrodes. As is the case with all spot welding electrodes, with sufficient usage, the electrodes of this invention will show signs of wear, possibly resulting in geometries that are out of tolerance with what is acceptable for the application. If this situation occurs, the electrodes may need to be replaced or re-dressed in an electrode tip dressing process. Material surface conditions, such as coatings or oil, may further impact the electrode wear and/or electrode efficacy.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method of electrical resistance spot welding, the method comprising the steps of:
   (a) providing a first workpiece having a portion with a curvature of a first radius and a second workpiece having a first portion with a curvature matching the curvature of the first workpiece and a second portion having a curvature;
   (b) providing first and second in-line electrodes that are each comprised of a body with a weld face at one end, the weld face having a contoured curvature, the contoured curvature of the first electrode covering the entire weld face of the first electrode and matching the curvature of the portion of the first workpiece, and the contoured curvature of the second electrode covering the entire weld face of the second electrode and matching the curvature of the second portion of the second workpiece, such that both electrodes and both workpieces are axially aligned in a first direction;
   (c) contacting the first electrode weld face with the portion of the first workpiece such that the matching curvatures of the first electrode weld face and the portion of the first workpiece are both oriented in a same direction relative to one another and in contact;
   (d) contacting the first portion of the second workpiece with the portion of the first workpiece such that the matching curvatures of the first workpiece and the first portion of the second workpiece are both oriented in a same direction relative to one another and in contact;
   (e) contacting the second electrode weld face and the second portion of the second workpiece such that the matching curvatures of the second electrode weld face and the second portion of the second workpiece are both oriented in a same direction relative to one another and in contact; and
   (f) applying pressure and electrical current to the first workpiece and the second workpiece to form at least one electrical resistance spot weld at the contacting portions of the first workpiece and the second workpiece.

2. The method as recited in claim 1, wherein each body has a dome shape or a cone shape adjacent the contoured curvature weld face.

3. The method as recited in claim 1, wherein the second workpiece contains a closed cross section.

4. The method as recited in claim 1, wherein the contoured curvature of each weld face is a concave groove.

5. The method as recited in claim 4, wherein the concave groove extends along a straight axis.

6. The method as recited in claim 5, wherein the straight axis of the concave groove is perpendicular to a longitudinal axis of the body.

7. The method as recited in claim 4, wherein each body has a dome shape or a cone shape adjacent the concave groove weld face.

8. The method as recited in claim 4, wherein the second workpiece contains a closed section.

9. The method as recited in claim 1, wherein the second workpiece contains an open cross section.

10. The method as recited in claim 4, wherein the second workpiece contains an open cross section.

11. The method as recited in claim 1, wherein the first workpiece is a curved sheet metal workpiece and the second workpiece has a closed circular cross section.

12. The method as recited in claim 1, wherein the first workpiece is a curved sheet metal workpiece and the second workpiece has a C-shaped cross section.

13. An electrode-workpiece arrangement for spot welding curved workpieces, comprising
   (a) a first workpiece having a portion with a curvature of a first radius and a second workpiece having a first portion with a curvature matching the curvature of the first workpiece and a second portion having a curvature;
   (b) a first electrode that comprises a body with a weld face at one end, the first electrode weld face having a contoured curvature covering the entire weld face and matching the curvature of the portion of the first workpiece, wherein the first electrode weld face contacts the portion of the first workpiece such that the matching curvatures of the first electrode weld face and the portion of the first workpiece are both oriented in a same direction relative to one another and in contact, and the first portion of the second workpiece contacts the portion of the first workpiece such that the matching curvatures of the first workpiece and the first portion of the second workpiece are oriented in a same direction relative to one another and in contact; and
   c) a second electrode that is axially aligned in a first direction with the first electrode and comprises a body with a weld face at one end, the second electrode weld face having a contoured curvature covering the entire weld face and matching the curvature of the second portion of the second workpiece, wherein the second electrode weld face contacts the second portion of the second workpiece such that the matching curvatures of the second electrode weld face and second the portion of the second workpiece are both oriented in a same direction relative to one another and in contact,
   wherein application of pressure and electrical current to the first workpiece and the second workpiece will form at least one electrical resistance spot weld at the contacting portions of the first workpiece and the second workpiece.

14. The electrode-workpiece arrangement as recited in claim 13, wherein each body has a dome shape or a cone shape adjacent the contoured curvature weld face.

15. The electrode-workpiece arrangement as recited in claim 14, wherein each contoured curvature is a concave groove.

16. The electrode-workpiece arrangement as recited in claim 15, wherein the concave groove extends along a straight axis.

17. The electrode-workpiece arrangement as recited in claim 16, wherein the concave groove is perpendicular to a longitudinal axis of the body.

18. The electrode-workpiece arrangement as recited in claim 13, wherein the second workpiece contains a closed cross section.

19. The electrode-workpiece arrangement as recited in claim 13, wherein the second workpiece contains an open cross section.

20. The electrode-workpiece arrangement as recited in claim 13, wherein the first workpiece is a curved sheet metal workpiece and the second workpiece has a closed circular cross section.

21. The electrode-workpiece arrangement as recited in claim 13, wherein the first workpiece is a curved sheet metal workpiece and the second workpiece has a C-shaped cross section.

* * * * *